(12) United States Patent
Lu et al.

(10) Patent No.: US 10,348,062 B2
(45) Date of Patent: Jul. 9, 2019

(54) LIGHTNING PROTECTION DEVICE AND TRANSMISSION MODULE THEREOF

(71) Applicant: Cheng-Chang Lu, New Taipei (TW)

(72) Inventors: Cheng-Chang Lu, New Taipei (TW); Sheng-Ju Yang, Taipei (TW)

(73) Assignee: Cheng-Chang Lu, New Taipei (TW)

( * ) Notice: Subject to any disclaimer, the term of this patent is extended or adjusted under 35 U.S.C. 154(b) by 0 days.

(21) Appl. No.: 15/962,511

(22) Filed: Apr. 25, 2018

(65) Prior Publication Data

US 2019/0109439 A1 Apr. 11, 2019

(30) Foreign Application Priority Data

Oct. 11, 2017 (TW) ............................ 106134721 A

(51) Int. Cl.
*H01T 23/00* (2006.01)

(52) U.S. Cl.
CPC .................................. *H01T 23/00* (2013.01)

(58) Field of Classification Search
CPC ..................................................... H01T 23/00
USPC ..................................................... 250/423 R
See application file for complete search history.

*Primary Examiner* — Nicole M Ippolito
*Assistant Examiner* — Hanway Chang
(74) *Attorney, Agent, or Firm* — Hamre, Schumann, Mueller & Larson, P.C.

(57) ABSTRACT

A lightning protection device includes a carrier module and a transmission module. The carrier module includes a housing unit defining an accommodating space and having a plurality of spaced-apart first vents and a plurality of spaced-apart fixing portions. An ion generating unit is disposed in the accommodating space for generating positive and negative ions. The transmission module includes a plurality of transmission units each including a transmission lever that has a lower end, an upper end, and a guide groove extending from the lower end to the upper end for guiding and diffusing the positive and negative ions generated by the ion generating unit to move toward the direction of the upper end, and a sensing probe connected to the upper end.

10 Claims, 7 Drawing Sheets

LIGHTNING PROTECTION DEVICE AND TRANSMISSION MODULE THEREOF

CROSS-REFERENCE TO RELATED APPLICATION

This application claims priority to Taiwanese Invention Patent Application No. 106134721, filed on Oct. 11, 2017.

FIELD

The disclosure relates to a lightning protection device and its transmission module.

BACKGROUND

Over the years, when the thundercloud is formed, the accompanying lightning strikes often have a serious impact on the safety of human life and property. Through scientific and technological progress, different types of lightning rods have been developed. Some of these lightning rods can guide lightning into the earth, while others can gather ambient electric charges to eliminate electric fields. However, whichever type of the foregoing lightning rods is used, such issues as the chance of the lightning striking and the protection range is too narrow can still arise in the protection zone of the lightning rod.

On the other hand, generally, the lightning rod must be installed at the top of a building and must have a good grounding work to achieve its maximum efficiency. However, repair and maintenance thereof are rather difficult to conduct.

SUMMARY

Therefore, an object of the present disclosure is to provide a lightning protection device that is capable of alleviating at least one of the drawbacks of the prior art.

Another object of the present disclosure is to provide a transmission module that can effectively prevent the formation of lightning.

According to one aspect of this disclosure, a transmission module is suitable for being disposed on a carrier module which generates positive and negative ions, and includes a plurality of transmission units, each of which includes a transmission lever and a sensing probe. The transmission lever has a lower end for fixing to the carrier module, an upper end opposite to the lower end, and a guide groove extending from the lower end to the upper end for guiding and diffusing the positive and negative ions generated by the carrier module to move toward the direction of the upper end of the transmission lever. The sensing probe is connected to the upper end of the transmission lever.

According to another aspect of this disclosure, a lightning protection device includes a carrier module and a transmission module. The carrier module includes a housing unit and an ion generating unit. The housing unit defines an accommodating space, and has a plurality of spaced-apart first vents communicating with the accommodating space, and a plurality of spaced-apart fixing portions opposite to the first vents. The ion generating unit is disposed in the accommodating space and is located between the first vents and the fixing portions. The ion generating unit is configured to generate positive and negative ions. The transmission module includes a plurality of transmission units, each of which includes a transmission lever and a sensing probe. The transmission lever has a lower end fixed to a corresponding one of the fixing portions, an upper end opposite to the lower end, and a guide groove extending from the lower end to the upper end for guiding and diffusing the positive and negative ions generated by the ion generating unit to move toward the direction of the upper end of the transmission lever. The sensing probe is connected to the upper end of the transmission lever.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
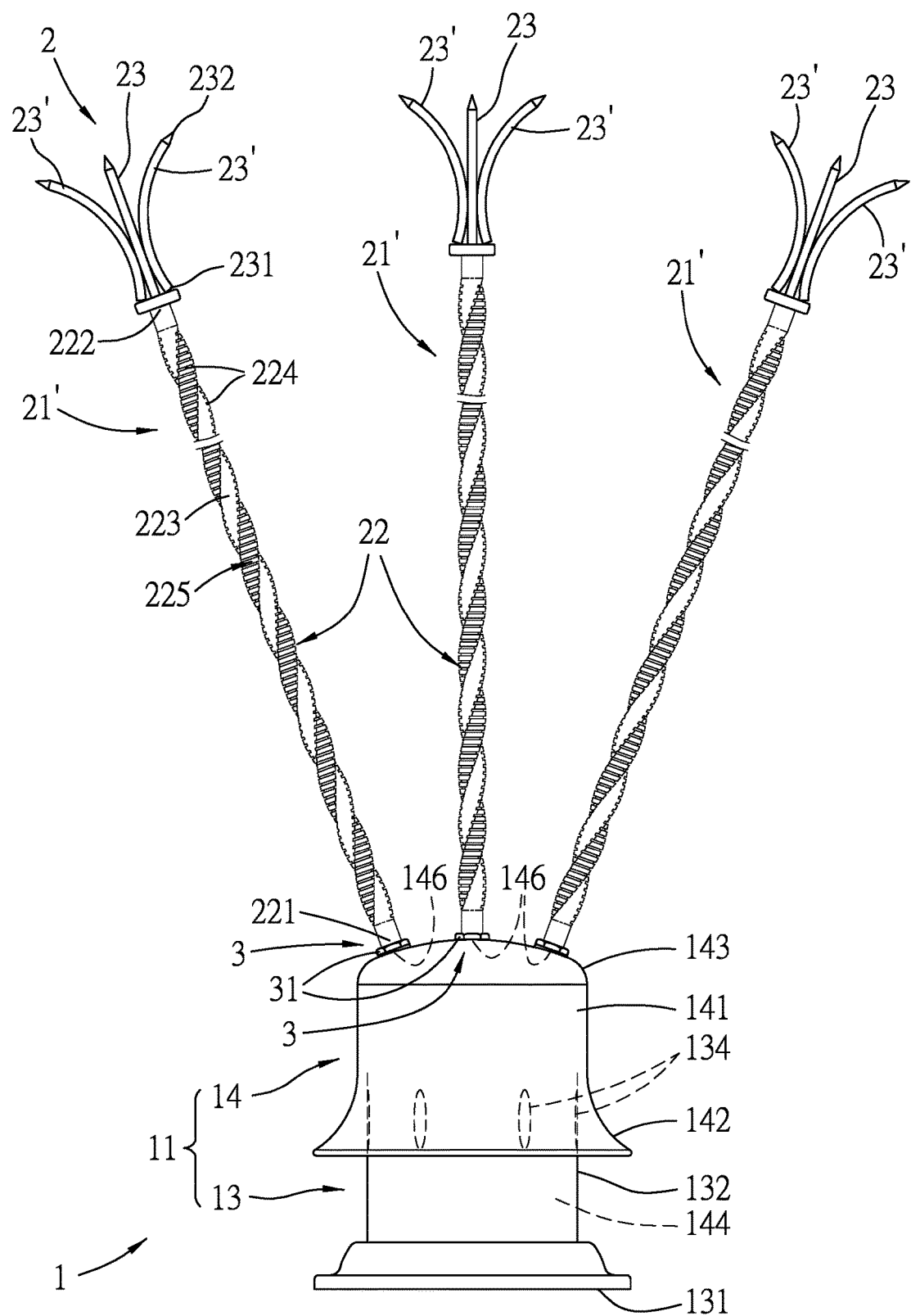
FIG. 1 is a schematic view of a lightning protection device according to the embodiment of the present disclosure.
Figure 2:
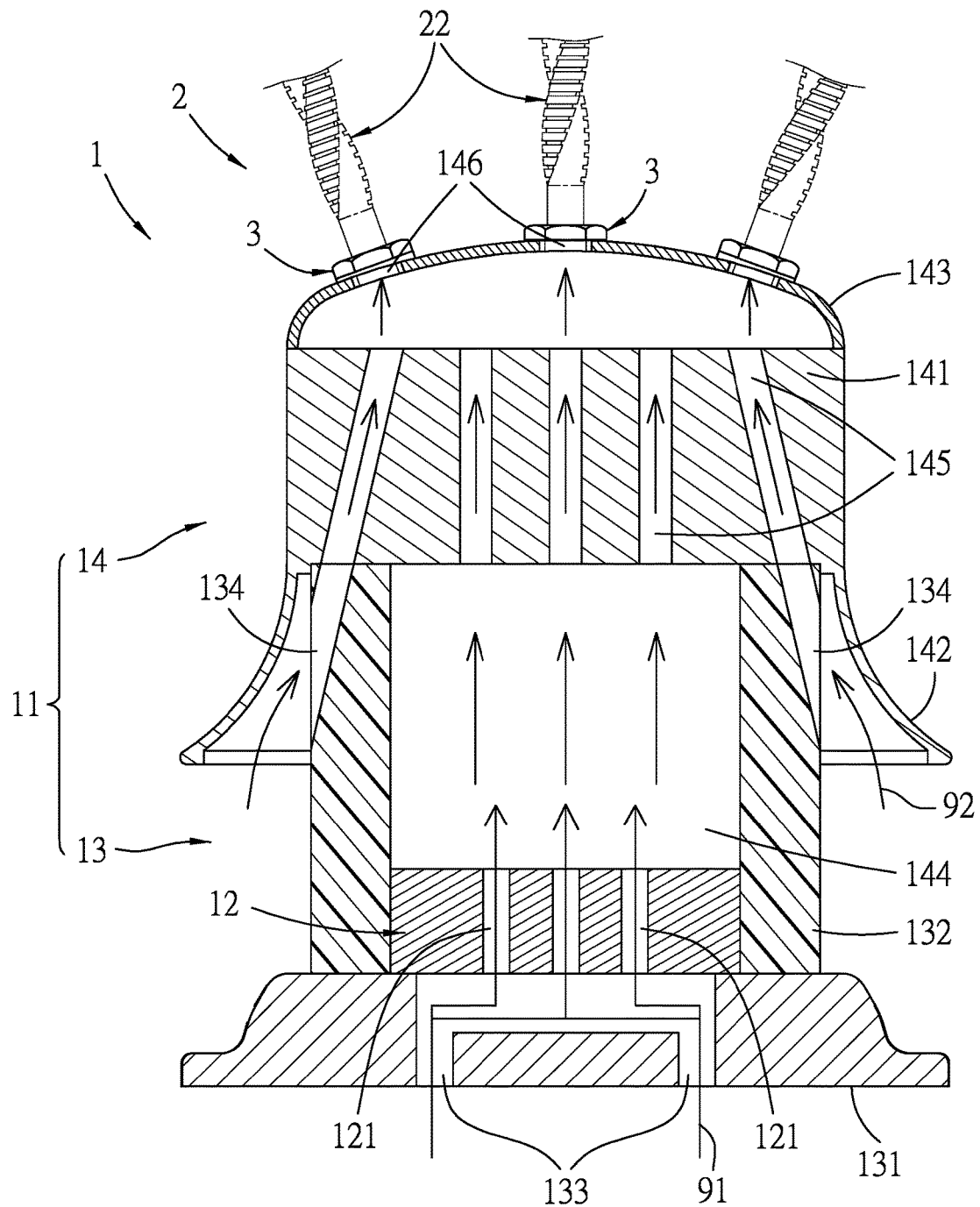
FIG. 2 is an enlarged sectional view of a carrier module of the embodiment.
Figure 3:
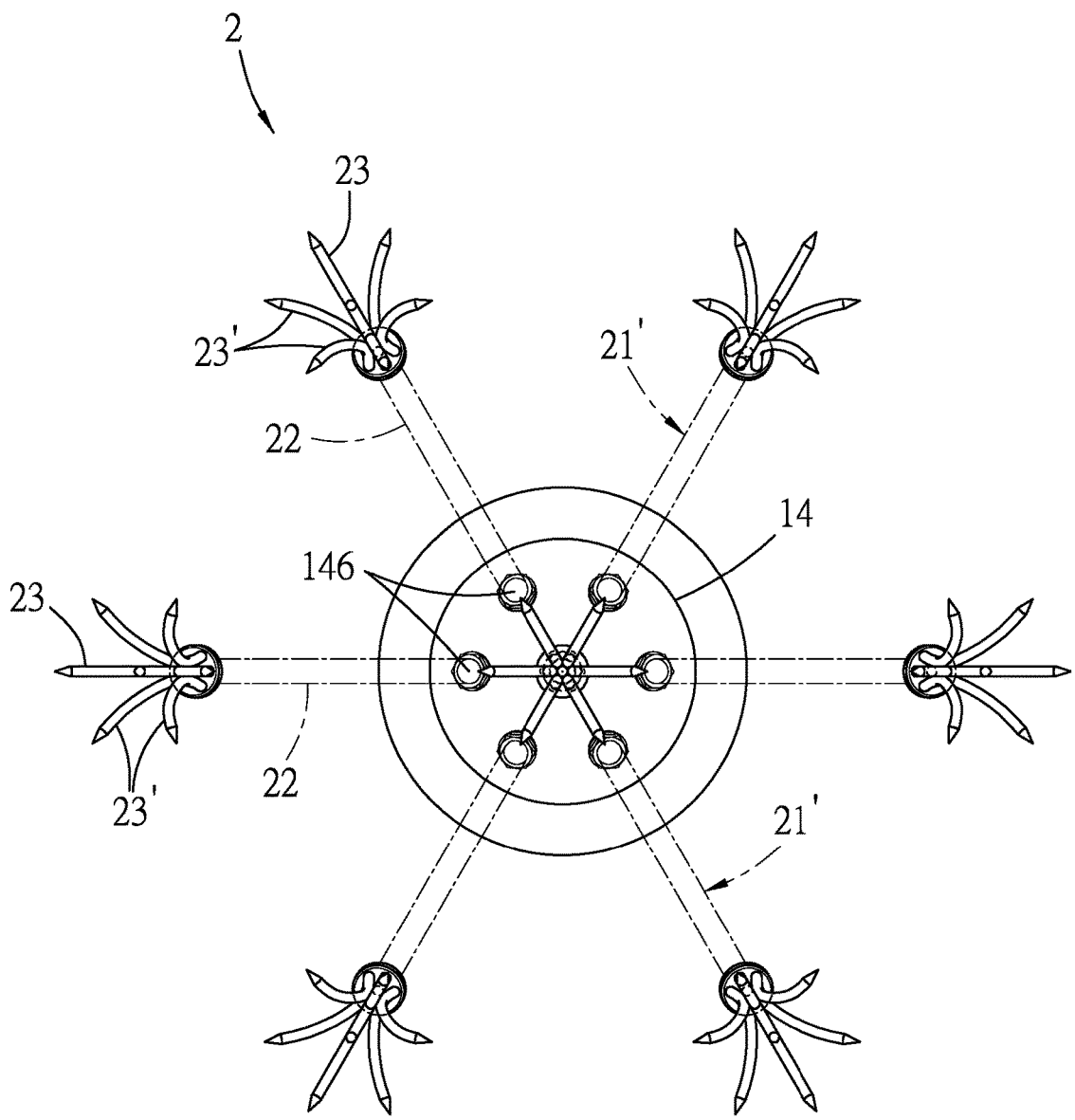
FIG. 3 is a schematic top view of the embodiment.

Referring to FIGS. 1 to 4, a lightning protection device according to the embodiment of the present disclosure is shown to include a carrier module 1, a transmission module 2 and a plurality of waterproof screw bolts 3. The lightning protection device is disposed on a top end of a building structure, such as a tall building, a wind turbine, or a tower.

The carrier module 1 includes a housing unit 11 and an ion generating unit 12. The housing unit 11 includes a lower housing body 13 and an upper housing body 14. The lower housing body 13 has a lower base 131 formed with a plurality of spaced-apart first vents 133, and a lower insulation surrounding wall 132 extending upwardly from the lower base 131 in proximity to an outer periphery thereof and formed with a plurality of second vents 134. The second vents 134 are distal from the lower base 131 and are spaced apart from each other around the lower insulation surrounding wall 132.

The upper housing body 14 has an upper base 141 connected to a top periphery of the lower insulation surrounding wall 132 and formed with a plurality of spaced-apart third vents 145, an upper blocking surrounding wall 142 extending downwardly and flaring outwardly from a bottom periphery of the upper base 141, and an upper end wall 143 that is curved, that is connected to a top periphery of the upper base 141, and that has a plurality of spaced-apart fixing portions 146 opposite to the first vents 133. A portion of the third vents 145 communicate with the second vents 134. The lower base 131, the lower insulation surrounding wall 132 and the upper base 141 cooperatively define an accommodating space 144 communicating with the first and third vents 133, 145. In this embodiment, each fixing portion 146 is a through hole formed in the upper end wall 143 and communicating with the accommodating space 144 through the third vents 145. Further, the upper end wall 143 has seven fixing portions 146, one of which is located at the center, while the other six of which surround the center fixing portion 146. Apart from the lower insulating surrounding wall 132 being made of an insulating engineering plastic material, the other components of this disclosure are made of metal for conducting electric charges.

The ion generating unit 12 is disposed in the accommodating space 144, and is formed with a plurality of spaced-apart through slots 121 communicating the first vents 133 with the accommodating space 144. In this embodiment, the electrodes of the ion generating unit 12 are spaced apart from each other by a distance. In a thundercloud environment, the ion generating unit 12 forms a strong electric field and a corona effect ionization generating positive and negative ions.

The transmission module 2 of this embodiment includes seven transmission units 21, 21', each of which has a transmission lever 22 and seven sensing probes 23, 23'. One of the transmission units is an upright transmission unit 21, while the other six transmission units are oblique transmission units 21' surrounding the upright transmission unit 21. Each oblique transmission unit 21' forms an acute angle with the upright transmission unit 21. The upright transmission unit 21 is inserted into the center fixing portion 146. The oblique transmission units 21' are respectively inserted into the fixing portions 146 surrounding the center fixing portion 146. Through this configuration, the protection range of the lightning protection device of this disclosure protecting the building structure can be expanded. To facilitate subsequent description, only three transmission levers 22 shown in FIG. 1 will be described hereinafter.

Figure 5:
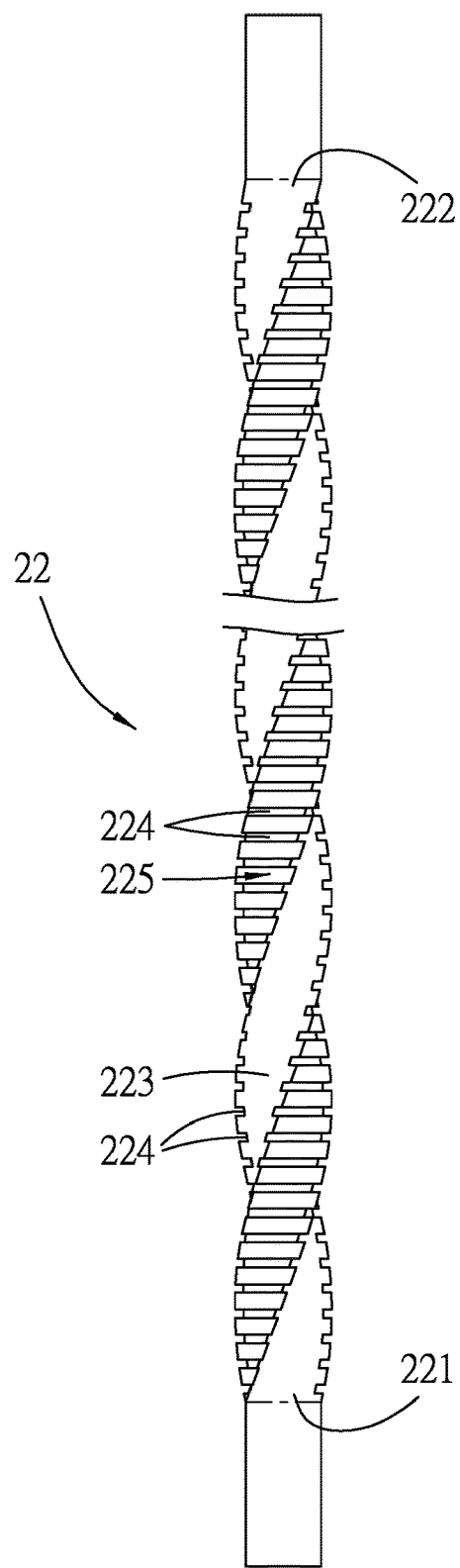
FIG. 5 is an enlarged schematic view of a transmission lever of the embodiment.

Referring to FIG. 5, in combination with FIG. 1, each transmission lever 22 has a lower end 221 fixed to a corresponding one of the fixing portions 146, an upper end 222 opposite to the lower end 221, and an outer surface 225 formed with a guide groove 223 extending from the lower end 221 to the upper end 222. In this embodiment, the upper end 222 of each transmission lever 22 has seven spaced-apart sensing probes 23, 23' connected to the upper end 222 thereof. It should be noted herein that the guide groove 223 is a helical guide groove which is formed by processing a solid rod. The solid rod can be square or circular, but not hollow. Furthermore, the helical guide groove 223 may be formed by other method such as die-casting.

The outer surface 225 of each transmission lever 22 is further formed with a plurality of concave grooves 224 extending inwardly therefrom and spaced apart from each other along a length direction of a corresponding one of the transmission levers 22. Each concave groove 224 extends in a direction transverse to the length direction of the corresponding transmission lever 22, and communicates with the helical guide groove 223.—A junction between each concave groove 224 and the outer surface 225 forms a tip effect of releasing positive and negative ions along the helical guide grove 223 and diffusing ions via vortex effect.

Figure 4:
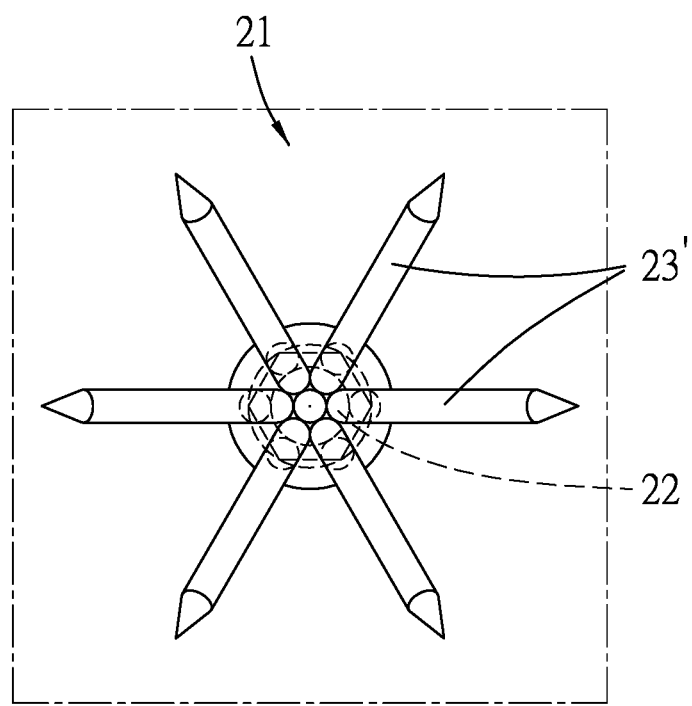
FIG. 4 is a schematic top view of sensing probes of a transmission unit of the embodiment.

With reference to FIGS. 1 and 4, each sensing probe 23, 23' of each transmission lever 22 has a bottom end 231 fixed to the upper end 222 of the corresponding transmission lever 22, and a top end 232 opposite to the bottom end 231 and having a sharp pointed end for forming a tip effect. It should be noted herein that one sensing probe 23 is aligned with the length direction of the corresponding transmission lever 22 and is located at the center of the upper end 222 thereof. The other six sensing probes 23' surround the center sensing probe 23, and extend upwardly, outwardly, and curvedly from the center of the upper end 222 of the corresponding transmission lever 22, so that the sensing probes 23, 23' can gather electric charges of the electric field of the thundercloud (not shown) by the tip effect.

Referring back to FIG. 1, each waterproof screw bolt 3 has two opposite ends respectively threaded to the lower end 221 of one of the transmission levers 22 and a corresponding one of the fixing portions 146, and a flange 31 between the two opposite ends thereof for covering the corresponding fixing portion 146. Through this, rainwater or other liquid may be prevented from entering the housing unit 11 through the fixing portions 146 so as to protect the ion generating unit 12 from damage. Each waterproof screw bolt 3 is not limited to threaded engagement with the lower end 221 of one of the transmission levers 22 and the corresponding fixing portion 146. As long as each waterproof screw bolt 3 can be connected to the lower end 221 of one of the transmission levers 22 and the corresponding fixing portion 146 so as to fix each transmission lever 22 to the upper end wall 143 of the housing unit 11 and the rainwater or the other liquid can be prevented from entering the housing unit 11, any connecting method is acceptable.

Figure 6:
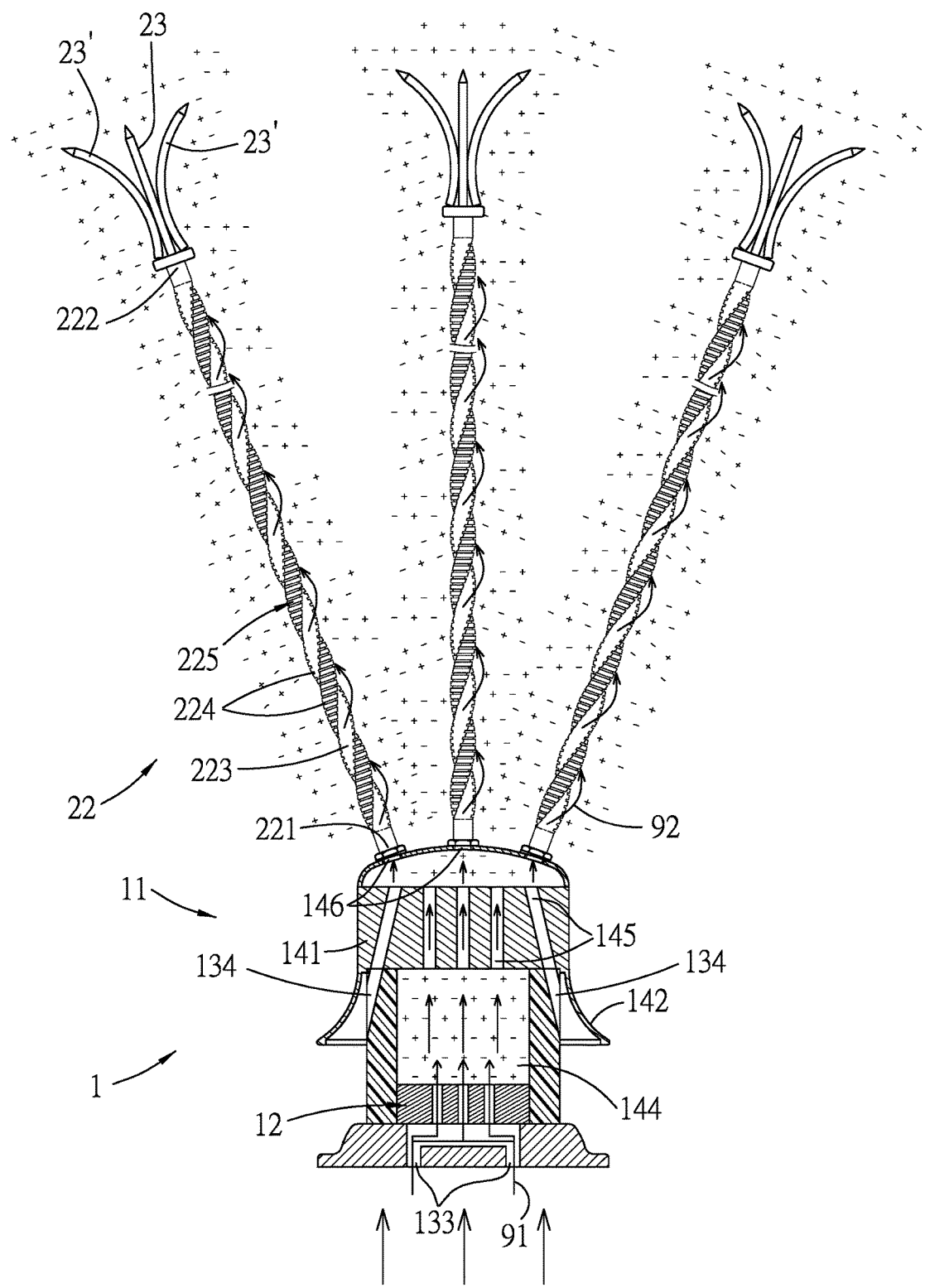
FIG. 6 is a schematic view of the embodiment, illustrating how positive and negative ions generated by an ion generating unit move toward the transmission levers of the transmission units.
Figure 7:
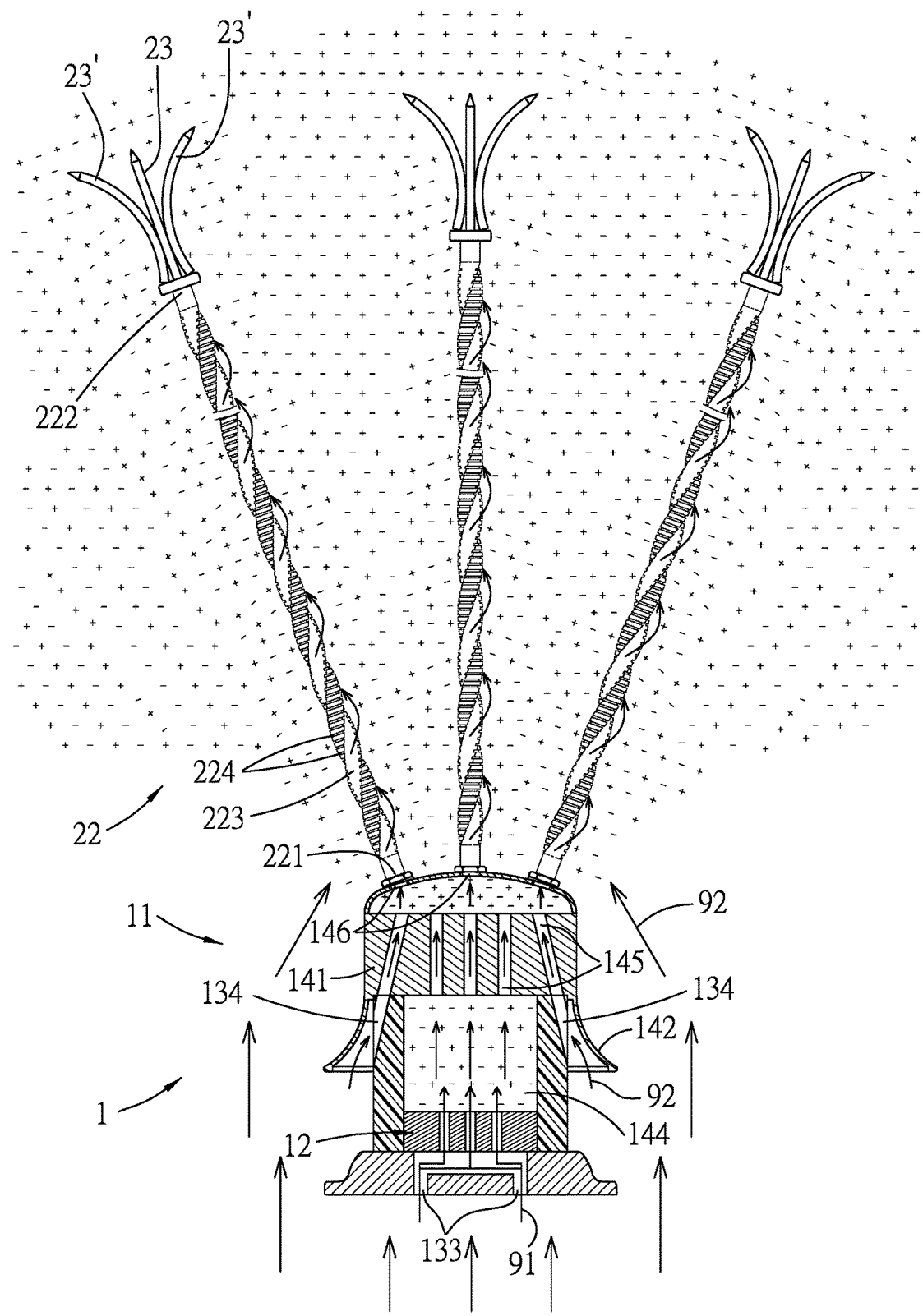
FIG. 7 is a view similar to FIG. 6, but illustrating the positive and negative ions being diffuse around the lightning protection device of this embodiment.

Referring to FIGS. 6 and 7, when the ion generating unit 12 generates positive and negative ions from a thundercloud environment, the positive and negative ions are moved toward the upper base 141 and are transmitted to the transmission levers 22. Subsequently, the positive and negative ions from the housing unit 11 move upward toward the direction of the upper ends 222 of the transmission levers 22. The positive and negative ions formed by the tip effect of the junction between each concave groove 224 and the outer surface 225 on the transmission levers 22 are released along the helical guide grooves 223 of the transmission levers 22 and are diffused around the lightning protection device of this embodiment and the above thundercloud. The electric charges from the electric field of the thundercloud gathered by the sensing probes 23 of the transmission module 2 are guided back to the ion generating unit 12 so as to activate and move the positive and negative ions toward the direction the upper ends 222 of the transmission levers 22 so as to neutralize with the electric charges of the thundercloud by diffusing around the lightning protection device and the above thundercloud, thereby preventing the formation of the lightning within protection area.

On the other hand, when an updraft passes through the lightning protection device of this disclosure, the updraft is divided by the same into an internal updraft 91 and an external updraft 92. The internal updraft 91 enters the accommodating space 144 through the first vents 133, and passes through the ion generating unit 12 and the third vents 145 to the fixing portions 146. At this moment, the internal updraft 91 provides the positive and negative ions with an upward driving force, so that more positive and negative ions can pass through the upper base 141 via the third vents 145 to the fixing portions 146. A portion of the external updraft 92 is blocked by the upper blocking surrounding wall 142, and enters the third vents 145 via the second vents 134 to provide the positive and negative ions in the upper base 141 with another upward driving force to push the positive and negative ions to the fixing portions 146. The other portion of the external updraft 92 flows along the guide grooves 223 of the transmission levers 22 toward the upper ends 222 thereof, and helically blows the positive and negative ions from the transmission levers 22, the positive and negative ions from the vortex effect of the helical guide groove 223, and the positive and negative ions gathered by the sensing probes 23 around the lightning protection device of this embodiment and the above thundercloud.

In sum, by using the guide grooves 223 of the transmission levers 22 to guide the positive and negative ions from the housing unit 11 to helically move toward the thundercloud and diffuse, and by using the upper blocking surrounding wall 142 to block a portion of the external updraft 92 and guide the same to flow to the upper base 141 via the first vents 133 so that more positive and negative ions can be moved to the fixing portions 146 and be transmitted to the transmission levers 22, the positive and negative ions generated from the lightning protection device of this disclosure can be diffused to the thundercloud and neutralize with the electric charges of the thundercloud, thereby neutralizing the discharge energy of the lightning. Therefore, the object of this disclosure can indeed be achieved.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A transmission module suitable for being disposed on a carrier module which generates positive and negative ions, said transmission module comprising:
    a plurality of transmission units, each of which includes
    a transmission lever having a lower end for fixing to the carrier module, an upper end opposite to said lower end, and a guide groove extending from said lower end to said upper end for guiding and diffusing the positive and negative ions generated by the carrier module to move toward the direction of said upper end of said transmission lever; and
    a sensing probe connected to said upper end of said transmission lever.

2. The transmission module as claimed in claim 1, wherein said guide groove is a helical groove.

3. The transmission module as claimed in claim 2, wherein said transmission lever further has a plurality of concave grooves communicating with said guide groove.

4. The transmission module as claimed in claim 3, wherein said transmission lever further has an outer surface formed with said guide groove, said concave grooves extending inwardly from said outer surface and being spaced apart from each other along a length direction of said transmission lever.

5. A lightning protection device comprising:
    a carrier module including
        a housing unit defining an accommodating space, and having a plurality of spaced-apart first vents communicating with said accommodating space, and a plurality of spaced-apart fixing portions opposite to said first vents, and
        an ion generating unit disposed in said accommodating space and located between said first vents and said fixing portions, said ion generating unit being configured to generate positive and negative ions; and
    a transmission module including a plurality of transmission units, each of which includes
        a transmission lever having a lower end fixed to a corresponding one of said fixing portions, an upper end opposite to said lower end, and a guide groove extending from said lower end to said upper end for guiding and diffusing the positive and negative ions generated by said ion generating unit to move toward the direction of said upper end of said transmission lever, and
        a sensing probe connected to said upper end of said transmission lever.

6. The lightning protection device as claimed in claim 5, wherein said guide groove is a helical groove.

7. The lightning protection device as claimed in claim 6, wherein said transmission lever further has a plurality of concave grooves communicating with said guide groove.

8. The lightning protection device as claimed in claim 7, wherein said transmission lever further has an outer surface formed with said guide groove, said concave grooves extending inwardly from said outer surface and being spaced apart from each other along a length direction of said transmission lever.

9. The lightning protection device as claimed in claim 5, wherein one of said transmission units is an upright transmission unit, while the other ones of said transmission units are oblique transmission units surrounding said upright transmission unit, each of said oblique transmission units forming an acute angle with said upright transmission unit.

10. The lightning protection device as claimed in claim 5, wherein:
    said housing unit includes:
        a lower housing body having a lower base formed with said first vents, and a lower insulation surrounding wall extending upwardly from said lower base in proximity to an outer periphery thereof, said lower insulation surrounding wall being formed with a plurality of second vents distal from said lower base and spaced apart from each other around said lower insulation surrounding wall; and
        an upper housing body having an upper base connected to a top periphery of said lower insulation surrounding wall, an upper blocking surrounding wall extending downwardly and outwardly from a bottom periphery of said upper base, and an upper end wall connected to a top periphery of said upper base, said upper base being formed with a plurality of spaced-apart third vents communicating with said accommodating space, said upper end wall having said fixing portions;
    said lower base, said lower insulation surrounding wall and said upper base cooperatively define said accommodating space; and
    said lightning protection device further comprising a plurality of waterproof screw bolts, each of which has two opposite ends respectively threaded to said lower end of one of said transmission levers and a corresponding one of said fixing portions, and a flange between said two opposite ends for covering the corresponding one of said fixing portions.

* * * * *